United States Patent [19]
Koike

[11] Patent Number: 6,092,799
[45] Date of Patent: Jul. 25, 2000

[54] SHEET SUPPLYING APPARATUS AND IMAGE READING APPARATUS

[75] Inventor: Michiro Koike, Kashiwa, Japan

[73] Assignee: Canon Kabushiki Kaisha, Tokyo, Japan

[21] Appl. No.: 09/056,813

[22] Filed: Apr. 8, 1998

[30] Foreign Application Priority Data

Apr. 11, 1997 [JP] Japan .................................. 9-093711

[51] Int. Cl.⁷ ...................................................... B65H 5/22
[52] U.S. Cl. ...................... 271/3.02; 271/3.07; 271/3.05; 271/98; 271/233; 271/171
[58] Field of Search ................................. 271/3.02, 3.05, 271/3.07, 94, 98, 105, 233, 234, 240, 171; 399/373, 372

[56] References Cited

U.S. PATENT DOCUMENTS

| | | | |
|---|---|---|---|
| 4,469,314 | 9/1984 | Robb et al. ............................ | 271/3.05 |
| 4,777,498 | 10/1988 | Kasamura et al. . | |
| 4,787,616 | 11/1988 | Sasaki et al. . | |
| 4,923,190 | 5/1990 | Hirosa ..................................... | 271/3.07 |
| 4,957,285 | 9/1990 | Yamada .................................... | 271/3.1 |
| 5,532,809 | 7/1996 | Hamanaka et al. ..................... | 355/308 |

FOREIGN PATENT DOCUMENTS

| | | | |
|---|---|---|---|
| 000457191 | 11/1991 | European Pat. Off. ................. | 271/98 |
| 0 757 010 | 2/1997 | European Pat. Off. . | |
| 59-190122 | 10/1984 | Japan . | |
| 404140267 | 5/1992 | Japan .................................. | 271/3.05 |

*Primary Examiner*—H. Grant Skaggs
*Attorney, Agent, or Firm*—Fitzpatrick, Cella, Harper & Scinto

[57] ABSTRACT

A sheet supplying apparatus capable of supplying sheets in a circulating manner, includes a sheet resting device on which the sheets rest, a sheet supplier for supplying the sheets rested on the sheet resting device, a trail and regulating member provided in correspondence to a trail position of the sheet and protruded from a sheet resting surface of the sheet resting device, and an urger for urging the sheets by abutting against the trail end of the sheet discharged on the sheet resting means through a sheet discharge opening to shift the sheet so that the trail end thereof rides over the trail end regulating member.

15 Claims, 13 Drawing Sheets

SHEET SUPPLYING APPARATUS AND IMAGE READING APPARATUS

BACKGROUND OF THE INVENTION

1. Field of the Invention

The present invention relates to a sheet supplying apparatus used in an image reading apparatus such as a copying machine and the like.

2. Related Background Art

Conventional automatic original supplying apparatuses can be divided into two types an original circulating type (RDF), and a non-circulating type (ADF). In the apparatuses of original circulating type (RDF), exposure is completed while an original being conveyed is passing through an exposure portion, and a discharge device on which the exposed originals are discharged is provided above (or below) an original resting portion, and, even when a plural number of parts are handled, such handling can be performed by re-circulating the originals successively.

Since a combination of a flow reading mode (in which the exposure is completed while the original is being shifted) and the original circulating type (RDF) can reduce "loss time" by the time corresponding to the shifting time period of the exposure device in comparison with a stationary or fixed reading mode (in which the exposure device is shifted along an area of the original after the original is once stopped), a time period for exchanging originals can be reduced, and high speed and high productivity in the copying system can be achieved. Further, in comparing a predetermined original exchanging time period, in the combination, it is evident that the originals can be circulated at lower shifting speed than the stationary mode, thereby reducing noise.

As an example of the combination of the flowing mode and the original circulating type (RDF), there is a system in which high speed and high productivity in the copying system can be achieved by using a flash exposure technique. In comparison with the above-mentioned exposure device, since the flash exposure technique is designed to expose the entire surface of the original simultaneously, a high power light source and a belt-type photosensitive member are required, thereby making the whole apparatus bulky and expensive and increasing power consumption. Thus, this technique has been adopted by only some of large and high speed apparatuses.

On the other hand, in the original supplying apparatuses of non-circulating type (ADF), the original is fixed to a predetermined position on a platen, and the exposure operations corresponding to the number of copies are repeated by reciprocally shifting the exposure device. After the exposure operations are finished, the original is discharged onto a predetermined discharge tray. By repeating such operations regarding the remaining originals successively, the plural number of copies for plural originals can be obtained. In this regard, as the copying system, since the originals are not required to be circulated repeatedly by combining with a sorter at an output side, the damage of the originals can be reduced.

Among the above-mentioned various conventional techniques, there have been proposed various techniques for achieving the high speed operation and reduction of noise. As an example, as shown in FIG. 13, there has been proposed an image reading apparatus in which originals P, resting on an original stacking plate 302, are automatically supplied by either of two sheet supply rollers 312, 313, provided on both ends of the original resting plate 302, in dependence upon the size of the original P or/and a selected mode. The supplied original is sent to a predetermined position on a platen 105 to which an image reading portion 311 of a copying machine 301 is opposed and at which an image on the original is read.

The apparatus shown in FIG. 13 includes a system capable of re-circulating the originals P. In the original stationary reading mode (mode in which the original is supplied by the sheet supply roller 312), the plural originals P resting on the original resting plate 302 are separated one by one by means of a retard belt 5a and a supply roller 5b (first separation/supply means), and the separated original is sent to the predetermined position on the platen 105 by a convey belt 315 through a path 314. After the image is read by shifting the image reading portion (optical system) 311 in the copying machine 301 in a direction shown by the arrow e in FIG. 13, the original P is directed into a discharge path 316 by reversely rotating the convey belt 315 and then is discharged onto the original resting plate 302 by discharge rollers 303.

When the flowing reading mode is selected, for example, originals having a small size (for example, A4 size, B5 size or LTR (letter) size) are stacked on the original resting plate 302. When a start key (not shown) of the copying machine 301 is turned ON, in a condition that an inlet sensor 307 is ON and an original length detect sensor 310 is OFF, the flow mode is started. First of all, the original resting plate 302 is rotated around a fulcrum 309 to be lowered to a predetermined position, where an original bundle (original stack) P is bundle-conveyed by a stopper (original bundle convey means) 306 toward a second separation belt 304 until the original bundle is detected by a bundle convey position detect sensor 308. Thereafter, the originals P are separated and supplied one-by-one by means of the separation belt 304 and a supply roller 305. When the original is sent onto the platen 105 by the convey belt 315 through a path 317, the image on the original P is read by the original flowing reading mode, and, thereafter, the original P is directed into the discharge path 316 and is discharged onto the original resting plate 302 by the discharge rollers 303.

Whenever the original P is discharged onto the original resting plate 302, a trail end of the original P is pushed by the stopper 306 toward the second separation belt 304, thereby improving registration between the originals. Thus, if the originals are circulated again, since the trail ends of all of the originals abuts against the stopper 306 after all of the originals P were discharged on the original resting plate 302, the originals can be bundle-conveyed collectively by the stopper 306 to effect re-supply of the originals.

On the other hand, in the original supplying apparatuses of non-circulating type (ADF), as shown in FIG. 14, when the original P is supplied onto the platen 105, the exposure device is fixed at a predetermined position below the platen 105. Then, the flow reading mode is effected. After the flow reading mode is finished, the original is discharged onto the discharge tray. However, if a plural number of copies are desired, after the flow reading mode is finished, the original P is not discharged, but, the original P is stopped temporarily at that position where the flow reading mode is finished. Thereafter, the image reading is effected by reciprocally shifting the exposure device by times corresponding to the predetermined number of copies, to then discharge the original onto the discharge tray. In this way, the plural number of copies can be obtained by the combination of the flowing mode and the stationary mode.

However, for example, in case of the apparatus shown in FIG. 13, since the apparatus is of the original circulating type, in the flowing mode, the high original exchanging speed can be obtained and high productivity can be achieved, so that, as mentioned above, noise can be suppressed. However, if plural number of copies are desired, each original must be circulated by times corresponding to the parts of copies, with the result that the original being passed through the separation means is subjected to stress and curl is generated in the original being passed through the curved path. Thus, the original P is greatly damaged, and, poor conveyance of the original during the handling of the original frequently occurs, thereby not achieving high reliability.

On the other hand, in case of the apparatus shown in FIG. 14, since the originals P are not re-circulated, although the damage of the originals can be reduced, there arise many problems in consideration of the high original exchanging speed and high accuracy for registration between the original P and a recording sheet on which the image is to be formed. For example, although the flow reading positions are defined at 401 or 402, for example, if the original having a small size is handled by the flow reading mode, in a copy mode having a 1:1 ratio, so long as an original-to-original distance is kept constant, predetermined productivity (processing efficiency) can be achieved. However, in a copy mode having 1:N (plural) ratio, since a distance lx from an image tip end timing sensor 403 to the flow reading position 401 is long, the original exchanging time period becomes great.

That is to say, when the combination of the flow reading mode and the stationary reading mode is effected, since the convey belt 404 cannot be shifted while a preceding original P is being read by the original stationary reading mode by shifting the optical system, a tip end of a succeeding original P must be waiting at a position at an upstream side in an original supplying direction (referred to merely as "upstream side" hereinafter) of the image tip end timing sensor 403. Thus, the original interval becomes great, with the result that the original exchanging time period is increased and high productivity cannot be achieved.

If the distance lx from the image tip end timing sensor 403 to the flow reading position 401 is shortened to improve the productivity, during the flow reading scan, the trail end of the original P will be subjected to shock due to the ON/OFF operation of a clutch of a separation/supply drive system provided at an upstream side, thereby distorting the image. As a result, the image reading reliability is worsened, or an image on a large sized original cannot be read, thereby providing an insufficient copying system.

To eliminate the above-mentioned drawbacks, there has been proposed an apparatus in which the damage of the originals is prevented, the noise of the apparatus is suppressed and high productivity can be achieved by combining the flow reading mode and the stationary reading mode. In this apparatus, by permitting scanning with the combination of the flow reading mode and the stationary reading mode, the scanning of the succeeding original P with the flow reading mode can be effected during the exchanging of the originals, with the result that the originals can be exchanged at a speed similar to an image forming process speed of about 500 [mm/sec] without increasing the original exchanging speed (although the originals are normally exchanged at a linear speed TOP of about 1300 [mm/sec]).

Further, since the productivity required for the original reading can be obtained, the reliability for reducing the noise and preventing the damage of the original P can be improved while maintaining high productivity. Further, since the image reading means and the original P are positioned in consideration of stop and rise-up control (minimum distance required for reaching the flow reading speed) of the original P to determine a positional relation between the flow reading image tip and the stationary reading image tip, and the flow reading is effected while keeping the distance between the preceding original P and the succeeding original P to permit continuous stationary reading, the reliability for achieving high productivity, reducing noise, and preventing the damage of original P can be improved.

In the above apparatus, as shown in FIG. 13, the known lower separation/supply system of a belt retard type, constituted by the retard belt 5a and the supply roller 5b, is used as the separation/supply means for the originals P. In this system, when the originals stacked in a face-up fashion are supplied from a lowermost one, there arises a problem that a rear surface of a second original P is rubbed by an imaged surface of a first original P to contaminate the rear surface. This problem has been solved more or less by proposing various countermeasures.

However, if sheets on which images were fixed in a poor manner are used as originals P and a large number of such sheets are stacked as an original bundle P, the above-mentioned contamination will become noticeable, and, thus, further improvement has been requested.

In consideration of the above, the inventors of this application have proposed an apparatus in which an air separation means is used as the separation/supply means disposed at the flow reading side which are normally utilized most frequently in the handling of the plural originals in order to improve productivity, as shown in FIG. 15. The air separation means has a separation air duct 23 having blowout nozzles 25 out of which air flows for floating the original bundle P, and a vacuum absorption belt 7 for air-absorbing and conveying a lowermost original P from the floating original bundle P.

In the above air supply system, by resting the originals on an original stacking tray 2 inclined upwardly toward the air separation means, it is necessary that double-feed of the originals is prevented and the trail ends of the originals are aligned with each other, by utilizing the weight of the original bundle P.

With this arrangement, an original bundle P including various originals having different sizes cannot be handled (however, in the apparatus shown in FIG. 15, since the conventional belt retard system is used at the stationary reading side, such an original bundle P including various originals having different sizes can be handled).

First of all, after the original bundle P is set on the original stacking tray 2 in the elevated position, when a copy button is depressed, the original stacking tray 2 is lowered to a flow reading permitting position and a recycle lever 3 is driven. The original stacking plate 2 is provided with an opening for preventing interference with the vacuum absorption belt 7.

Inside side regulating plates 4, there is disposed a detect means (not shown) for detecting a thickness of the original bundle P on the basis of a rotational angle of the recycle lever 3, and this detect means comprises a gear system for amplifying the rotational angle of the recycle lever 3, and a slit plate/photo-sensor for outputting the amplified rotational angle as a number of pulses (pulse number). When the recycle lever 3 is rested on the original bundle P, pulse signals corresponding to the thickness of the original bundle P are generated from the slit plate/photo-sensor of the detect means, which signals are sent to an MPU (microprocessor unit) for controlling the apparatus. In the MPU, the number of pulses is calculated, and, on the basis of a loop-up table (LUT) representing a relation between the number of pulses and a rotational amount of a separation air valve 24, a drive signal is sent from the MPU to a stepping motor for driving the separation air valve 24, thereby rotating the separation air valve 24 by a predetermined amount.

The LUT serves to control the device so that the rotational amount of the separation air valve 24 is controlled to increase a separation air blow amount in accordance with the thickness of the original bundle P as the thickness of the original bundle P is increased, i.e., to gradually increase the rotational amount of the separation air valve 24 from a completely closed condition to increase the separation air blow amount in proportion to the increase in the number of pulses corresponding to the thickness of the original bundle P, thereby separating the originals P effectively.

At the same time, a drive signal is sent from the MPU to a separation air fan motor, so that separation air, having a blow amount corresponding to the thickness of the original bundle, is blown against the original bundle P. Thereafter, the original bundle P is conveyed, by an abut shutter (first trail end regulating member) 41, to a position where the originals can be air-separated. When the original bundle P is conveyed, the vacuum absorption belt 7 is rotatingly driven at the speed same as a conveying speed of the original bundle P. In this way, the separation and supply of the original bundle P can surely be effected without destroying the original bundle.

However, in the aforementioned conventional example, although there is no problem when the size of the originals P to be used is predetermined, since the copying machine is normally designed so that originals P having various different sizes such as normal size, B5 size, A4 size, B4 size, A3 size and the like can be copied, the original supply for the next copying operation cannot sometimes be effected. The reason is that, for example, if the original stacking plate 2 is set to accommodate the largest original (having a maximum length (in an original conveying direction) among the above-mentioned sizes; i.e., A3 size original), for example, in the case where originals smaller than the A3 size original are used, when the originals are discharged onto the original stacking plate 2 again by discharge rollers 16 through a discharge path 19, the originals are stacked on the original stacking plate 2 in a non-aligned condition.

To avoid this, in the conventional technique, a rear wall of the original stacking plate 2 integral with the original discharge portion is shifted in accordance with the size of the original P to adjust the length of the original stacking plate 2 in the original conveying direction. However, since the original discharge opening is also shifted together with the rear wall, an independent drive system must be prepared for the original discharge portion or an arrangement capable of varying the distance of the convey path to the original discharge opening must be provided. Thus, the original discharge portion and the convey path to the original discharge portion are made bulky, thereby making the entire apparatus bulky.

Further, when the expansible/collapsible guide is used for varying the distance of the convey path, there is a great danger of jamming the original P at the junction of the guide, thereby worsening reliability. In addition, the original discharge opening must be shifted by the operator himself, and thus operability is also worsened.

Further, if the original discharge opening is shifted automatically in accordance with the size of the original P, since the apparatus becomes bulky and complicated, reliability is worsened.

SUMMARY OF THE INVENTION

The present invention intends to eliminate the above-mentioned conventional drawbacks, and has an object of the present invention to provide a sheet supplying apparatus and an image reading apparatus, in which, when sheets are discharged onto a sheet resting means again through a sheet discharge opening, trail ends of the sheets can be aligned effectively to permit next sheet supply, thereby improving operability, and the apparatus can be made compact.

To achieve the above object, according to the present invention, there is provided a sheet supplying apparatus capable of supplying sheets in a circulating manner, comprising a sheet resting means on which the sheets are rested, a sheet supply means for supplying the sheets rested on the sheet resting means, a trail end regulating member provided in correspondence to a trail position of the sheet and protruding from a sheet resting surface of the sheet resting means, and an urging means for urging the sheets by abutting against the trail ends of the sheets discharged on the sheet resting means through a sheet discharge opening to shift the sheets so that the trail ends of the sheets ride over the trail end regulating member.

With this arrangement, the trail end regulating member protrudes from the sheet resting surface of the sheet resting means and is positioned.

And, when the sheet is discharged through the sheet discharge opening, the sheet is dropped onto the sheet resting means, and the trail end of the sheet rides on the trail end regulating member.

Immediately after the sheet is dropped, the urging means is operated to shift the sheet riding on the trail end regulating member to the predetermined position, so that the trail end of the dropped sheet is regulated by the trail end regulating member to be aligned with the other sheets.

Whenever the sheet is discharged through the sheet discharge opening, the above-mentioned operation is performed, so that, even when the sheet discharge opening is fixed with respect to the main body of the apparatus, the trail end of the sheet discharged through the sheet discharge opening is aligned with the other sheet by the trail end regulating member at the predetermined position, regardless of the size of the sheet.

Since the present invention has the above-mentioned arrangement, even when the sheet discharge opening is fixed with respect to the body of the apparatus, the trail ends of the sheets can surely be aligned with each other regardless of the size of the sheet, thereby improving the stability of sheet conveyance, improving operability, and making the apparatus compact.

DETAILED DESCRIPTION OF THE PREFERRED EMBODIMENTS

Now, an embodiment of a sheet supplying apparatus and an image reading apparatus of the present invention applied to a copying machine will be explained with reference to the accompanying drawings.

Figure 1:
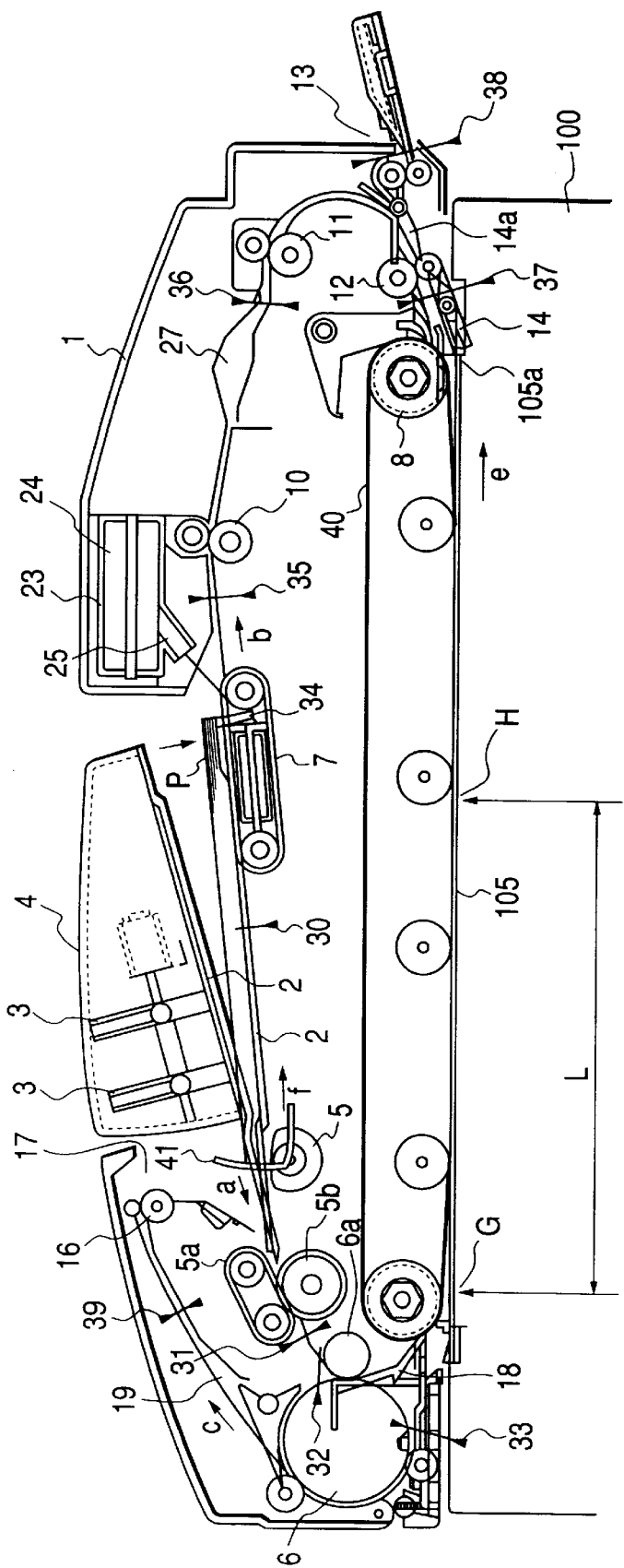
FIG. 1 is a sectional view of a sheet supplying apparatus according to the present invention.

FIG. 1 shows a circulating automatic original supplying apparatus (RDF) 1 as a sheet supplying apparatus according to the present invention, and, first of all, a fundamental flow of originals in the apparatus will be described. In FIG. 1, an original bundle P, including sheet-shaped originals resting on an original resting tray (original resting means) 2 of the circulating automatic original supplying apparatus 1, can be switched toward a side shown by the arrow a (switch-back path) or toward a side shown by the arrow b (closed loop path) in accordance with a set mode and an original size.

That is to say, in case of large size (for example, B4 size, A3 size and the like) originals or a mixture of various size originals, the originals P are supplied from the side a (switch-back path) in FIG. 1, and the supplied original is conveyed, by a convey belt 40 through a path 18, to a predetermined position on a platen 105 of an image forming apparatus 100 and is positioned there. After an exposure operation effected by an optical system is finished, the convey belt 40 is rotated reversely to return the original in a direction shown by the arrow c toward a discharge path 19. Then, the original is discharged onto the original resting tray 2 by discharge rollers 16 through an original discharge opening (sheet discharge opening) 17.

A recycle lever 3 disposed in an original resting portion serves as a partition member for partitioning original bundle P including originals which were already read from the original bundle P including originals which are not yet read. In the illustrated embodiment, two recycle levers 3 are provided in accordance with the size of the original P. When a copy button (not shown) is depressed, the recycle levers 3 rest on an uppermost original in the original bundle resting on the original resting tray 2. Since the originals P are fed out from a lowermost side by a semi-circular (D-shaped) sheet supply roller (sheet supply means) 5 or the vacuum absorption belt 7 to be separated and supplied, the recycle levers 3 resting on the original bundle P are lowered below the original resting surface of the original resting tray 2 after all of the originals in the underlying original bundle are conveyed to the platen 105, thereby recognizing the fact that one cycle circulation of the originals P is finished.

The reference numeral 5a denotes a retard belt for separating the originals P supplied from the original resting tray 2 by the sheet supply roller 5; and 5b denotes a supply roller opposed to the retard belt 5a and adapted to supply only the lowermost original P. The reference numeral 6a denotes a convey roller for directing the original P separated by the retard belt 5a and the supply roller 5b onto the platen 105; 6 denotes a reverse rotation roller; and 16 denotes discharge rollers provided at the original discharge opening (sheet discharge opening) 17 to direct the original P discharged from the platen 105 to the platen 105 again or to the original resting tray 2.

In a one-face copy mode for a small size original, the originals P are supplied from the side b in FIG. 1, and the supplied original is conveyed, by the convey belt 40 through a path 27, to a predetermined position on the platen 105 of the image forming apparatus 100 and is positioned there. After then exposure operation is finished, the original is returned in the direction shown by the arrow c toward the discharge path 19. Then, the original is discharged onto the original resting tray 2 by the discharge rollers 16 through the original discharge opening 17.

The reference numeral 7 denotes an air absorption belt for separating and supplying the originals P on the original resting tray 2 from the lowermost side toward the side b (closed loop path) in FIG. 1; 23 denotes a separation air duct having separation air nozzles; and 10 denotes convey rollers. The reference numeral 11 denotes a pair of regist rollers at the side b (closed loop path) in FIG. 1; and 12 denotes a back-up roller provided in a turn path portion to handle a thick sheet more effectively. The original resting tray 2 is lowered to a position permitting the sheet supply at the side b (closed loop path) in FIG. 1. The back-up roller 13 also acts as a sheet supply roller for supplying an original P inserted into a manual insertion path 13.

When the original is supplied from the side b in FIG. 1, a turn flapper 14 is normally is positioned above an end 105a of the platen 105 to guide the original P so that the original is not caught by the end 105a of the platen 105. Even when the original P is manually supplied, one-by-one from the manual insertion path 13, the original P is positioned above the end 105a of the platen 105 by the closed loop path flapper 14, and, after the copy is finished, when the original is returned toward a direction shown by the arrow e, the flapper is retarded below the end 105a of the platen 105 to pick up the original from the end 105a. The returned original P is directed to the manual insertion path 13 by a flapper 14a and then is discharged.

Now, a main construction of the separation/supply portion using the air separation will be explained with reference to FIGS. 2 and 3. As shown in FIG. 3, in the circulating automatic original supplying apparatus 1 using the vacuum absorption belt 7, the original resting tray 2 on which the originals are rested is provided at its front central part with a notched portion 2a, and the vacuum absorption belt 7 formed from a rubber belt having a number of holes 2b is attached in the notched portion 2a. A vacuum box 26 is disposed within the vacuum absorption belt 7. When the air is sucked through the holes 2b of the vacuum absorption belt 7 by means of a blower connected to the vacuum box, the lowermost original P in the original bundle is absorbed by the vacuum absorption belt, and, the original P is fed out in the conveying direction by the rotation of the vacuum absorption belt 7.

The separation air duct 23 disposed above a tip end of the vacuum absorption belt 7 has a plurality of side-by-side nozzles 25 for blowing out air downwardly and obliquely to enter the air between the lowermost original P picked up by the vacuum absorption belt 7 and the original bundle P, and, if two originals P are picked up in an overlapped condition, these originals are separated from each other by the action of the air and only the lowermost original is supplied.

Figure 2:
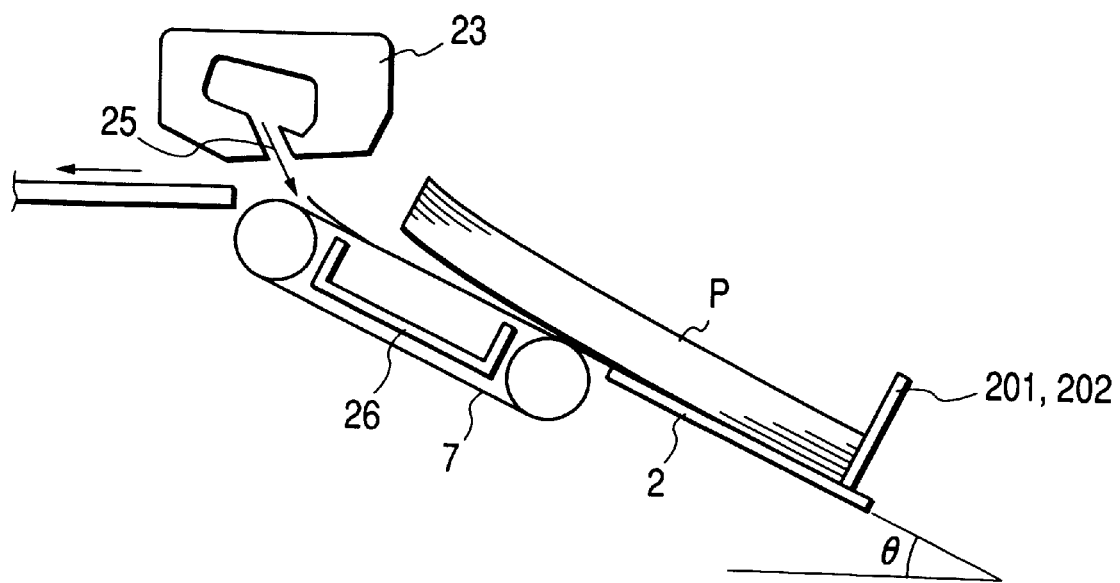
FIG. 2 is a sectional view showing an air separation device.
Figure 3:
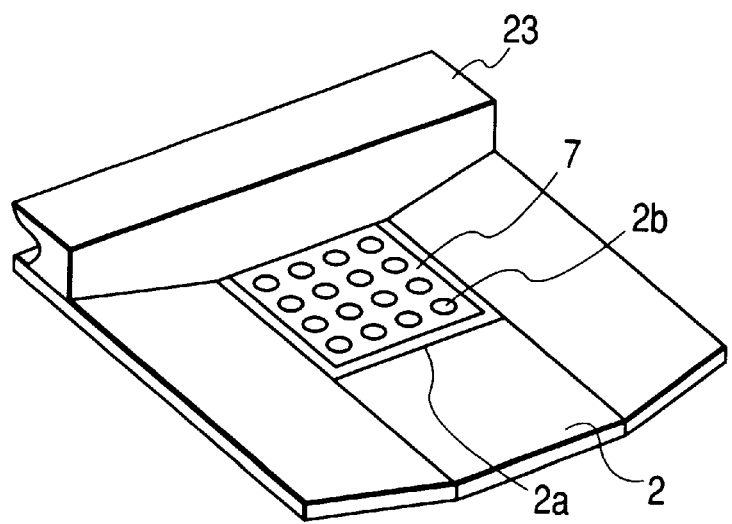
FIG. 3 is a perspective view showing a vacuum absorption belt of the air separation device.

In the circulating original automatic supplying apparatus 1, in order to prevent the double feed of second and other originals P, as shown in FIG. 2, the original resting tray 2 is generally inclined by a predetermined angle θ so that a downstream end (in the conveying direction) is positioned above an upstream end. And, the originals P rest on the original resting tray 2 in a condition that the trail ends of the originals abut against trail end regulating plates (second trail end regulating members) 201, 202 for regulating the trail ends. Incidentally, the details of the trail end regulating plates 201, 202 will be described later.

Figure 4:
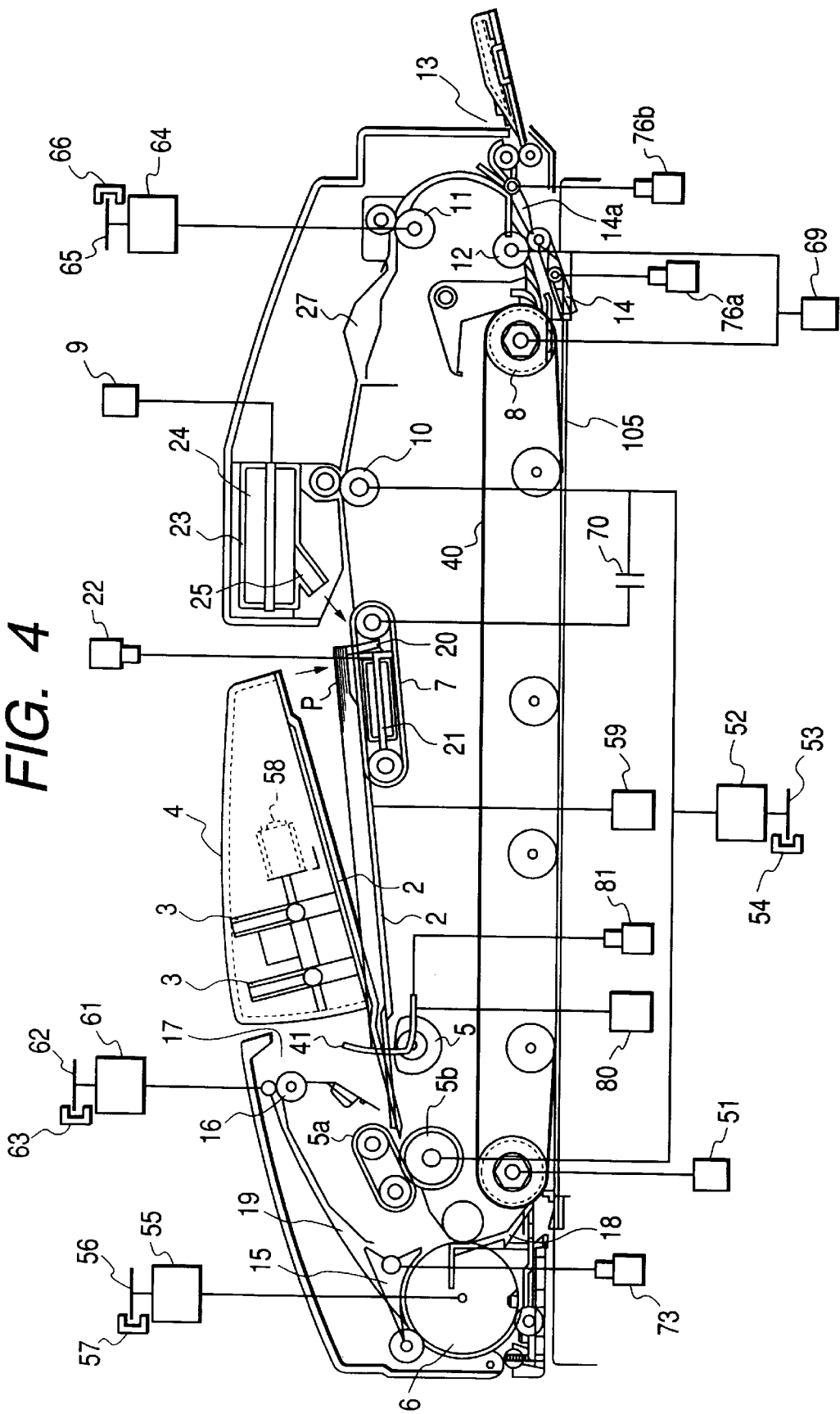
FIG. 4 is an explanatory view showing a drive system of the sheet supplying apparatus according to the present invention.

FIG. 4 shows a drive system for the circulating original automatic supplying apparatus 1. In FIG. 4, a stepping motor 51 is used as a drive means for the convey belt 40 disposed above the platen 105 to convey the original P onto the platen 105. The reason why the stepping motor 51 is used is that good control can be obtained (i.e., good control response of start/stop can be obtained) and same speed relation between the convey belt 40 and the regist rollers 11 and the back-up roller 12 subjected to the driving force from the convey belt 40 are maintained with high accuracy.

Further, the back-up roller 12 receives the rotational driving force from the turn roller 8 driven by the convey belt 40, so that the driving force is transmitted in a condition that the peripheral speed of the back-up roller is the same as the peripheral speed of the convey belt 40. The regist rollers 11 at the closed loop path side are driven by a stepping motor 64. The reason why the stepping motor 64 is used is that the speed of the regist rollers is made the same as the speed of the convey belt 40 to obtain high accurate registration.

As mentioned above, in the illustrated embodiment, while an example that the convey belt 40 and the regist rollers 11 are driven by the stepping motors 51, 64 was explained, as another arrangement, uniform speed control at the transfer portion may be effected by PLL (frequency follow circuit) control of a DC motor or a single drive source and a clutch means may be provided so that the convey belt 40 and the regist rollers 11 are operated simultaneously by the same drive source by ON/OFF of the clutch means.

The reference numeral 65 denotes a clock disc attached to a drive shaft of the stepping motor 64; and 66 denotes a clock detect sensor as a means for detecting out-of-phase operation of the stepping motor 64. Further, a separation motor 52 serves to drive the retard belt 5a and the supply roller 5b (constituting the separation/supply means at the switch-back side) when it is rotated normally and to drive the vacuum absorption belt 7 and the convey roller 10 (constituting the separation/supply means at the closed loop side) when it is rotated reversely.

A clock disc 53 for controlling the speed is secured to a rotary shaft of the separation motor 52, and an associated clock detect sensor 54 is provided. When the separation motor 52 is rotated reversely, the rotational driving force from the separation motor 52 is transmitted to the vacuum absorption belt 7 through a clutch 70, so that the vacuum absorption belt 7 can selectively be operated/stopped by ON/OFF of the clutch 70.

Further, as a drive means for registration and reverse rotation at the switch-back side, a reverse rotation motor 55 is provided for driving a reverse rotation roller 6. In the illustrated embodiment, the reverse rotation motor 55 is constituted by a DC motor so that uniform speed control between the convey belt 40 and the reverse rotation roller 6 can be effected by PLL control. Further, a clock disc 56 for permitting the PLL control is secured to a rotary shaft of the reverse rotation motor 55, and an associated clock detect sensor 57 is provided. Incidentally, the reverse rotation motor 55 may be constituted by a stepping motor so that the uniform speed control can be effected in synchronism with the stepping motor 51 for rotatingly driving the convey belt 40.

The discharge rollers 16 are rotatingly driven by a discharge motor 61. A clock disc 62 is secured to a rotary shaft of the discharge motor 61 to permit the uniform speed control upon transferring of the original between the discharge rollers and the reverse rotation roller 6 and upon discharging of the original P, and an associated clock detect sensor 63 is provided. Further, a tray lift/lower motor 59 is provided as a drive means for a lift/lower means (not shown) for lifting and lowering the original resting tray 2 during the closed loop sheet handling.

The trail end of the original bundle P is regulated by the abut shutter 41 as the first trail end regulating member (upon setting of the originals), and, when the closed loop sheet handling is started, the original bundle is conveyed until the tip end of the original bundle P reaches an inlet portion of the sheet supply roller 5, retard belt 5a and supply roller 5b as the closed loop separation/supply means. As a bundle-convey drive means in this case and a drive means for jogging the original P returned after the closed loop sheet handling toward the separation/supply means again, a stepping motor 80 is provided to form a bundle-convey motor.

As mentioned above, a recycle motor 58 is attached to the side regulating plate 4 to act as a drive source for driving the recycle levers 3 as the partition between the original bundle P including the originals which were already read and the set original bundle P. Further, there are provided a stepping motor 80 for driving the abut shutter 41 to effect the bundle-convey by abutting against the trail end of the original bundle P, and a solenoid 81 for retarding the abut shutter 41 upon the sheet supply at the switch-back side.

Further, there are provided fan motors (not shown) for blowing out the separation air at the separation air duct 23 and for sucking the air at the vacuum absorption belt 7, respectively. A separation air valve 24 for changing the air blow amount in accordance with the thickness of the original bundle P (described later) is disposed within the separation air duct 23, and the driving of this valve is controlled by the stepping motor 9 in accordance with the thickness of the original bundle P.

Next, solenoids and associated elements will be described. An air valve 21 for effecting ON/OFF of air suction in synchronism with the supplying of the original P is disposed within a suction duct 20 for air absorbing the original P through the vacuum absorption belt 7, and the opening and closing of the air valve 21 is controlled by a solenoid 22.

Further, there is provided a reverse rotation flapper solenoid 73 for rotating a reverse rotation flapper 15 for switching between the discharge mode and the both-faces copy mode during the switch-back reverse rotation. There are provided solenoid 76a for rotating a closed loop path flapper 14 for switching the positions with respect to the platen 105 upon the manual original supply and upon discharging of the original, and a solenoid 76b for rotating a flapper 14a for guiding the original P to the manual insertion path 13.

Next, sheet sensors in the paths and the image reading position will be described with reference to FIG. 1. Within the path through which the original supplied from the switch-back side (arrow a in FIG. 1) is passed, there are disposed an empty sensor 30 for detecting the fact that the originals P are set on the original resting tray 2, a separation sensor 31 for detecting the fact that the originals P are separated, a switch-back registration sensor 32 for providing timings of registration of the original P and skew-feed vibration, a reverse rotation sensor 33 for detecting the fact that the original P is returned from the platen 105 in the switch-back fashion, and a discharge sensor 39 for detecting the discharging of the original P.

Within the path through which the original supplied from the closed loop path side (arrow b in FIG. 1) is passed, there is disposed an original set sensor 34 for detecting whether or not the length of the original P is greater than half size (A4 size, LTR (letter) size, B5 size) by detecting the presence/absence of the trail end of the original P upon setting the originals. In this path, the empty sensor 30 for detecting the fact that the originals P are set on the original resting tray 2 is also used.

If the original P has the half size, i.e., if the empty sensor 30 is turned ON and the original set sensor is turned OFF, it is judged that the original P has the half size, and the originals P are supplied from the closed loop path side (arrow b in FIG. 1). Actually, detection of a width of the original P is performed simultaneously by the empty sensor 30, the original set sensor 34 and an original width detect means (not shown), and, in the illustrated embodiment, A4 size, LTR size and B5 size are judged.

The original set sensor 34 serves to detect the tip end (end near the closed loop path side) of the set original bundle P bundle-conveyed by shifting the abut shutter 41 in a direction shown by the arrow f in FIG. 1 when the original resting tray 2 is lowered upon the closed loop path original supplying. The original set sensor 34 also acts as an original tip end detect sensor for stopping the abut shutter 41 at the point that the tip end of the original bundle P reaches the separation position by shifting the abut shutter by a predetermined number of clocks after the tip end is detected.

The reference numeral 35 denotes a closed loop separation sensor; 36 denotes a closed loop registration sensor for providing timings of closed loop registration of the original P and skew-feed vibration; 37 denotes an image tip sensor for determining the positioning of the original P on the platen 105; and 38 denotes a sensor for detecting manual original setting and discharging.

A home position of the optical system (image reading means when the scanning is effected while fixing the original P and shifting the optical system) at the start of the exposure is a stationary reading image tip position G shown in FIG. 1. A flow reading image tip position H spaced apart from the stationary reading image tip position G to the right by a distance L is a scanning point when the scanning is effected while fixing the optical system and shifting the original P.

Next, the construction of the image forming apparatus 100 having the circulating original automatic supplying apparatus 1 (sheet supplying apparatus according to the present invention) will be explained with reference to FIG. 5. As is well known, the optical system (image reading means) has an original illumination lamp 101 for illuminating the imaged surface of the original P on the platen 105, mirrors 102, 103, 104 for directing the light reflected from the imaged surface of the original P to a zoom lens 106, and a mirror 111 for directing the light passed through the zoom lens 106 to an electrophotographic photosensitive drum (image forming means).

In the optical system, the original illumination lamp 101 and the mirrors 102, 103, 104 (constituting an exposure portion) are reciprocally shifted in a left-and-right direction in FIG. 5 below the platen 105 to read image information of the original P resting on the platen 105 and fixed at the predetermined position on the platen. Further, the optical system is also designed so that the exposure portion can be fixed to the predetermined position to read the image information of the original P while the original P is being shifted on the platen 105.

The light including the image information of the original P read by the optical system illuminates on the photosensitive drum 107 uniformly charged by a first charger 110, thereby forming an electrostatic latent image on the photosensitive drum, and the electrostatic latent image is developed by a developing device 115 with toner to form a toner image.

On the other hand, a recording sheet selectively supplied from an upper front tray 123, a lower front tray 124, a multi feeder 116 or a side tray 117 by a separation/supply means is sent to a pair of regist rollers 120, where the skew-feed of the recording sheet is corrected. Then, the recording sheet is conveyed between the photosensitive drum 107 and a transfer charger 131 in synchronism with the rotation of the photosensitive drum 107. The toner image formed on the photosensitive drum 107 is transferred onto the recording sheet by the action of the transfer charger 131. The recording sheet to which the toner image was transferred is separated from the photosensitive drum 107 by a transfer separation charger 122. The separated recording sheet is sent to a fixing device 128, where the toner image is permanently fixed to the recording sheet with heat and pressure. Thereafter, the recording sheet is discharged into a sorter (copy sheet output device) 132 through a discharge portion 130.

When images are formed on both surfaces of the recording sheet, the recording sheet is directed, by a switch flapper provided in the discharge portion 130, to a second convey portion 127, where the recording sheet is reversely rotated. Then, the recording sheet is temporarily stored on an intermediate tray 126. The recording sheet is conveyed by a re-supply portion 121 to the pair of regist rollers 120 again. In this way, the image is formed on a second surface of the recording sheet in the similar manner as mentioned above. Then, the recording sheet is discharged into the sorter 132.

Figure 5:
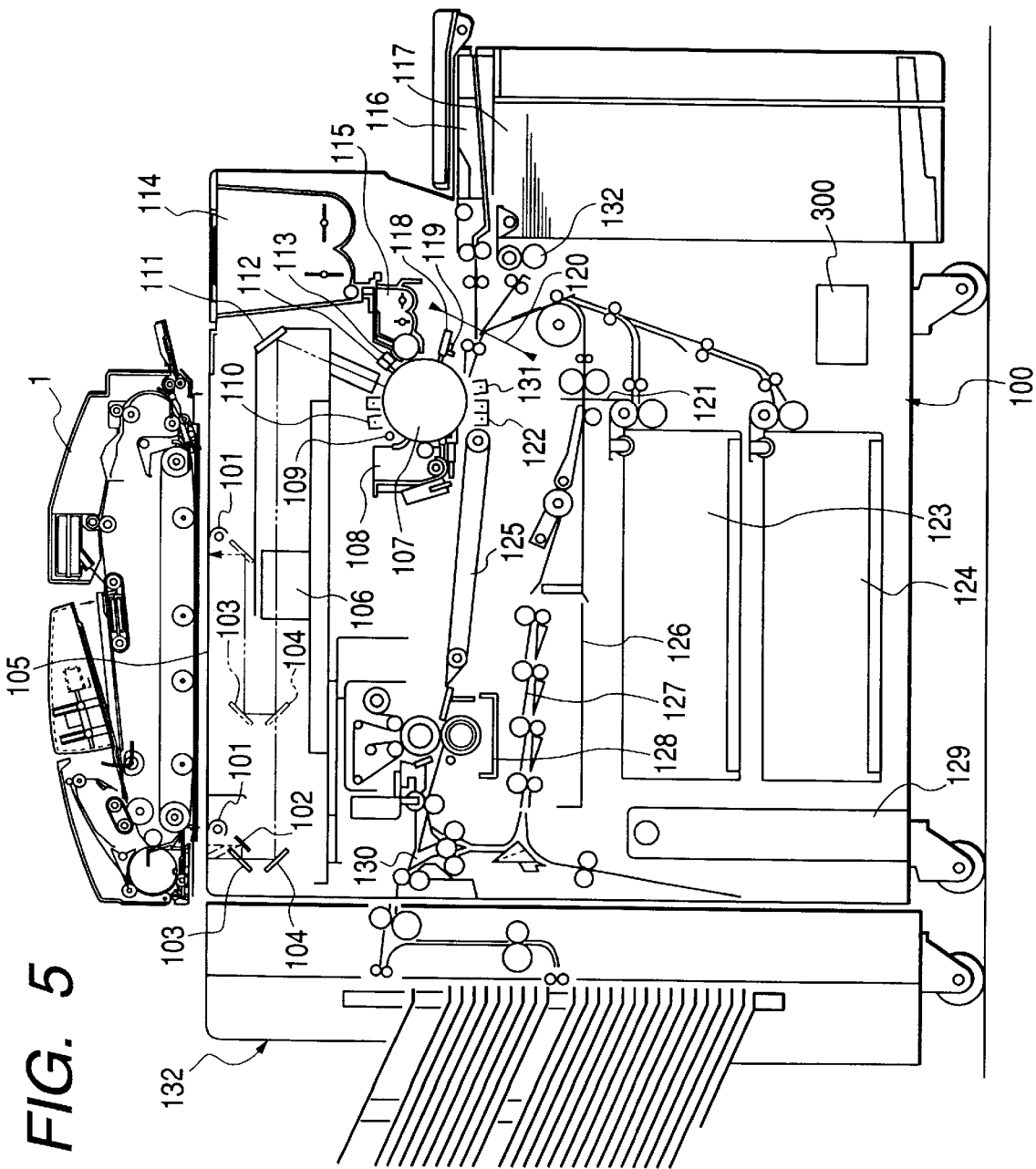
FIG. 5 is a sectional view of an image forming apparatus including an image reading apparatus having the sheet supplying apparatus according to the present invention.

Incidentally, in FIG. 5, the reference numeral 108 denotes a drum cleaner; 109 denotes a pre-exposure lamp; 112 denotes a blank exposure lamp; 113 denotes a potential sensor; 114 denotes a toner hopper portion; 118 denotes a roller electrode; 119 denotes a pre-transfer charger; and 129 denotes a waste toner collecting container.

In the flow reading mode, the size of the original P which can rest on the original resting plate 2 is, for example, B5 size, A4 size or LTR size (small size). When the originals P having such different sizes are to be air-separated, as mentioned above, the original P must be conveyed so that the tip end of the original is aligned with the predetermined position on the vacuum absorption belt 7 regardless of the size of the original.

Figure 10:
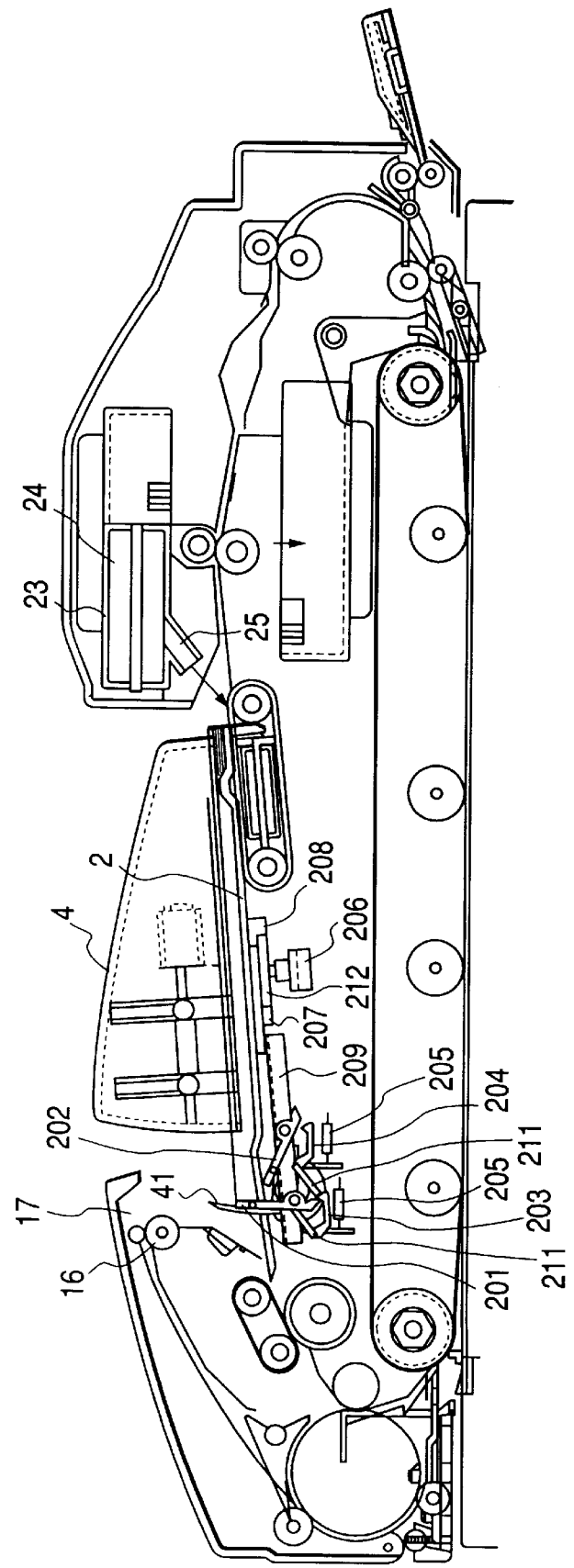

Further, the discharge rollers 16 and the original discharge opening 17 are fixed with respect to the body of the circulating original automatic supplying apparatus 1, as mentioned above. So, when the original bundle P tries to be bundle-conveyed to effect the separation and supply, among the originals having plural sizes, regarding the originals having the small length in the conveying direction, as shown in FIG. 10, the abut shutter 41 is positioned at a downstream side (right in FIG. 10) of the discharge rollers 16 when the bundle-conveyance is effected. If the abut shutter 41 is positioned at that position, the original P discharged from the discharge rollers 16 onto the original resting tray 2 rides on the abut shutter 41, with the result that the discharged original P cannot be shifted by the abut shutter 41. Thus, the original P cannot be conveyed to the predetermined position on the vacuum absorption belt 7, thereby causing the poor supply in the next original supply.

In the flow reading mode, there is a danger of occurring the above poor supply of the B5 size original and A4 size original regarding the LTR size original P.

The characteristic of the sheet supplying apparatus according to the present invention is effective to solve the above-mentioned problems, and the construction of the sheet supplying apparatus will now be described with reference to FIGS. 6 to 12.

Figure 9:
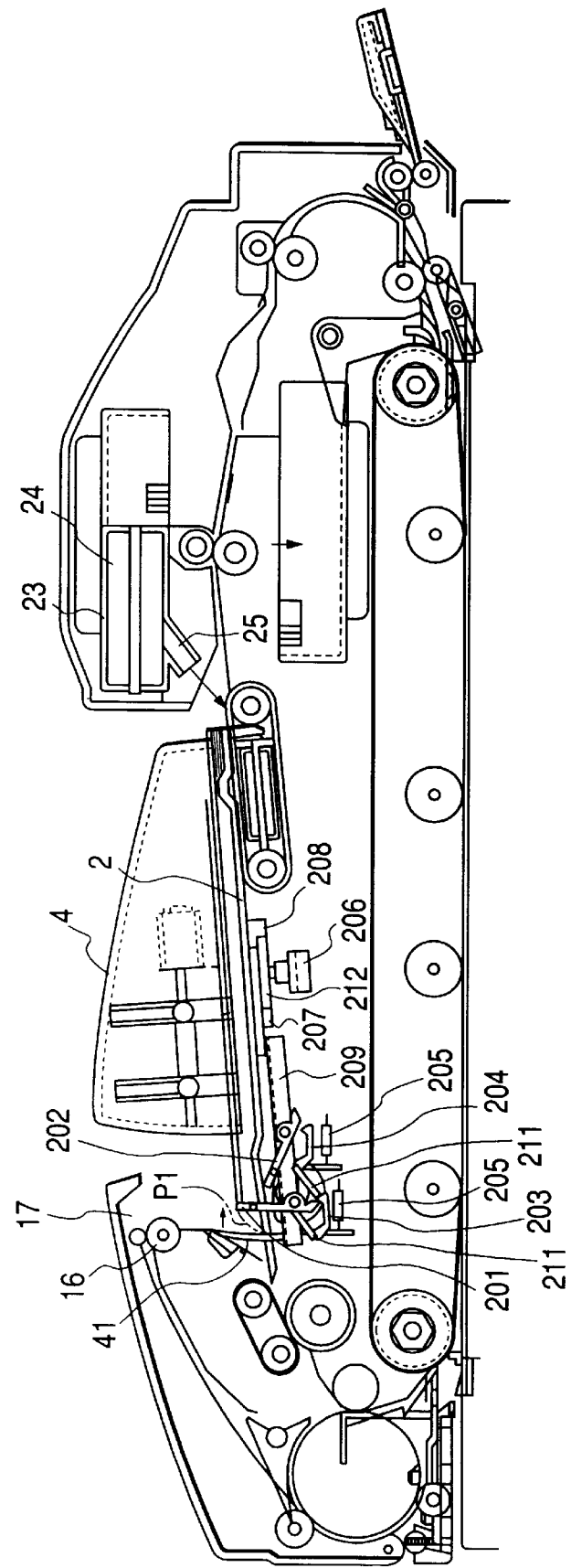
FIGS. 9, 10, 11 and 12 are sectional views for explaining the operation of the trail end regulating member.

As shown in FIG. 9, the trail end regulating plates 201, 202 are always biased by springs 211 to be retarded from the resting surface of the original resting tray 2 and are positioned at predetermined positions by stopper members (not shown).

Figure 6:
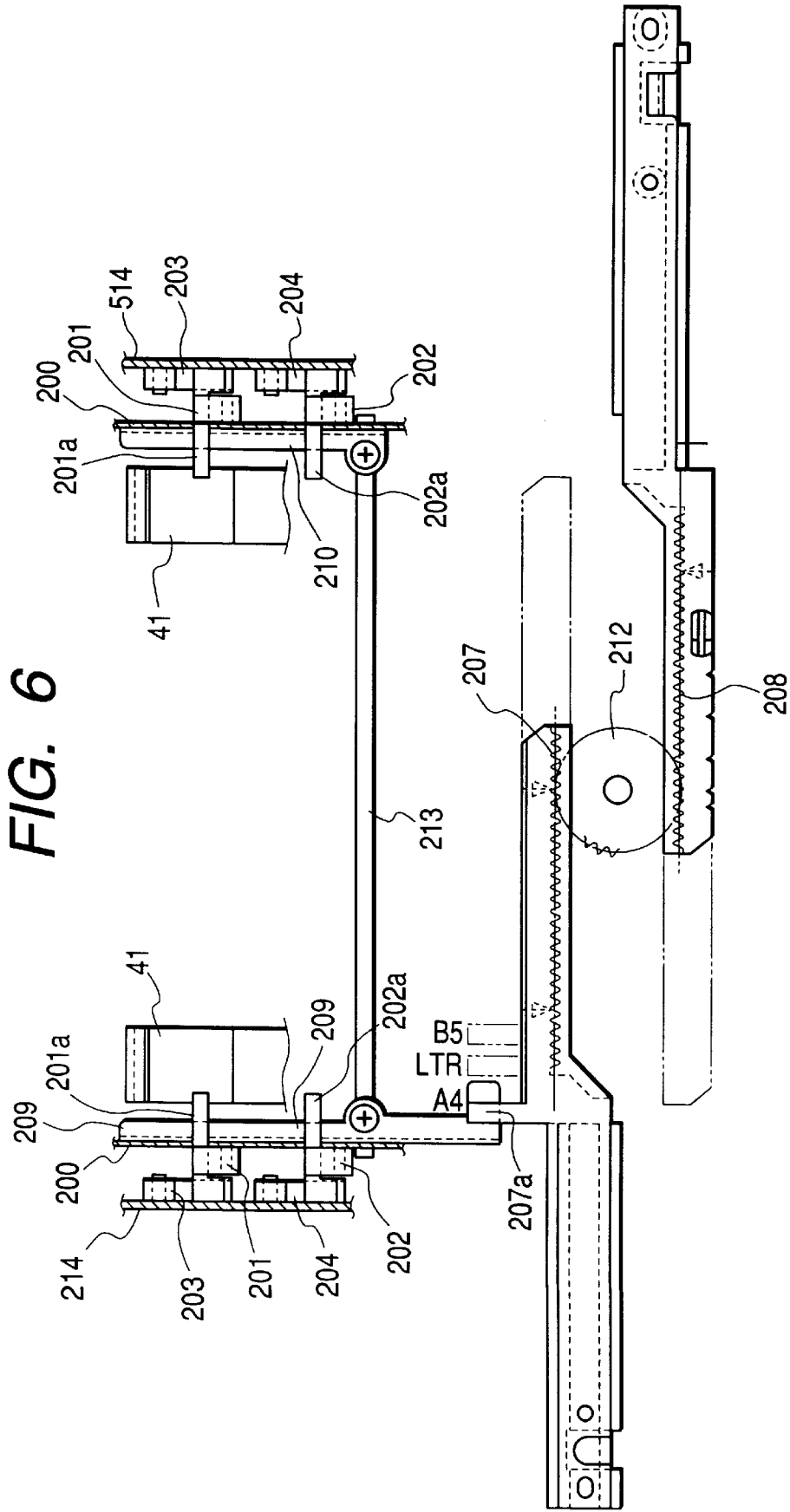
FIG. 6 is a rear view of a drive mechanism for a trail end regulating member.

Further, as shown in FIG. 6, hook members 203, 204 are rotatably supported by a base member 214 of the circulating original automatic supplying apparatus 1 so that the hook members can be engaged by the trail end regulating plates 201, 202 at their cocked positions. The hook members 203, 204 are biased by springs 205 to be engaged by the trail end regulating plates 201, 202 and are positioned at predetermined positions by stopper members (not shown).

The trail end regulating plates (second trail end regulating members) 201, 202 are provided with arm portions 201a, 202a, respectively, for engaging with the abut shutter (first trail end regulating member) 41, so that the trail end regulating plates 201, 202 are cocked in synchronism with the operation of the abut shutter 41. The trail end regulating plate 201 for A4 size original P is not cocked when the abut shutter 41 is operated during the bundle-conveyance of the B5 size original bundle P.

The side regulating plates 4 for determining the widthwise position of the original bundle P are provided on the original resting tray 2. In the side regulating plates 4, rack members 207, 208, engaged by a pinion gear 212 integral with a potentiometer 206 for detecting the width of the original P, are disposed on a rear surface of the original resting tray 2, thereby detecting the width of the original P.

Figure 7:
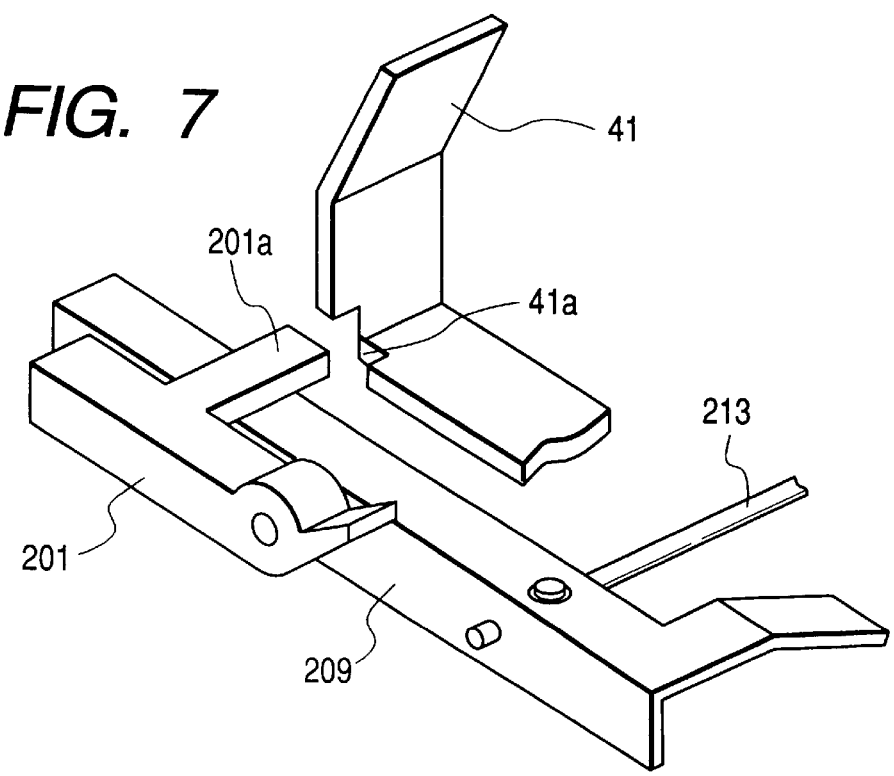
FIGS. 7 and 8 are perspective views showing a part of the drive mechanism for the trail end regulating member.
Figure 8:
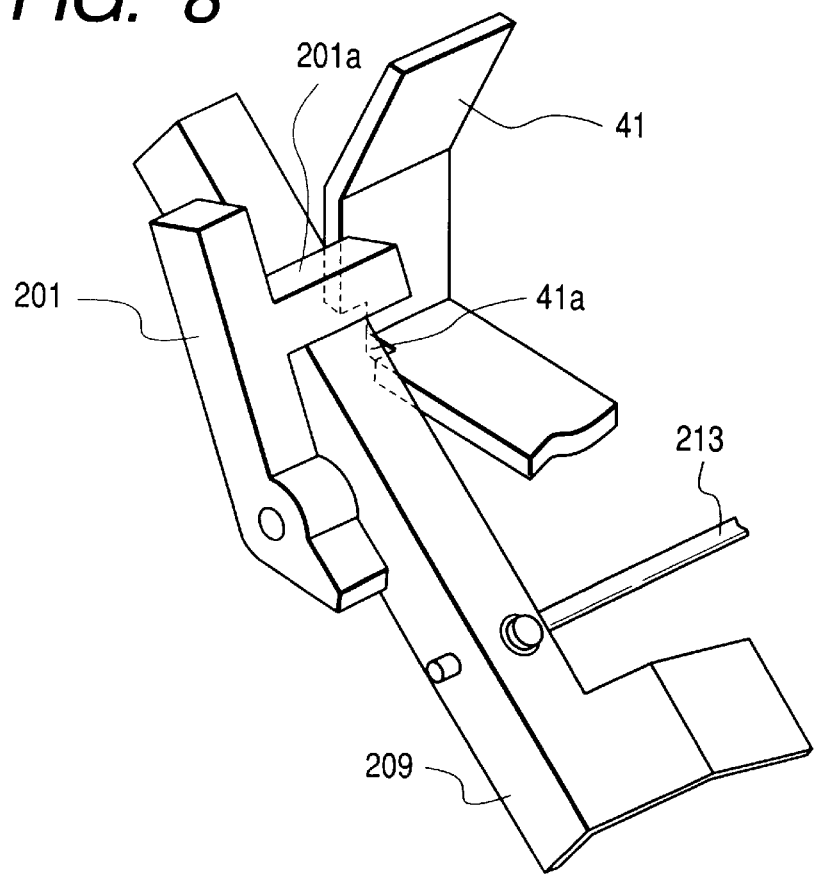

On the other hand, as shown in FIG. 6, levers 209, 210 for engaging with the A4 size original trail end regulating plate 201 are rotatably supported by a support plate 200 via a shaft 213. One end of the lever 209 is engaged by the A4 size original trail end regulating plate 201 and the other end is engaged by a projection 207a provided on one end of the rack member 207. As shown in FIGS. 7 and 8, only when the side regulating plates 4 are set at the A4 size original set position, the projection 207a of the rack member 207 is engaged by the lever 209, thereby rotating the levers 209, 210 around the shaft 213. As a result, the arm portion 201a of the A4 size original trail end regulating plate 201 is passed through the notched portion 41a of the abut shutter 41 by the action of the lever 209 to be lifted from a position shown in FIG. 7 to a position shown in FIG. 8 to permit the engagement between the A4 size original trail end regulating plate and the abut shutter 41.

In this position, the A4 size original trail end regulating plate 201 is not protruded upwardly from the original resting surface of the original resting tray 2. A positional relation is so selected that the A4 size original trail end regulating plate 201 can be shifted between the two positions in synchronism with the side regulating plates 4 and the A4 size original trail end regulating plate 201 can be engaged by the abut shutter 41 at the elevated position where the A4 size original trail end regulating plate is lifted by the levers 209, 210. Thus, regarding originals other than the A4 size original, the A4 size original trail end regulating plate 201 is not cocked even when the abut shutter 41 is shifted. On the other hand, the B5 size original trail end regulating plate 202 is positioned at a position where it can be engaged by the abut shutter 41 to be cocked.

Now, the operation of the arrangement as mentioned above will be fully explained. Regarding the LTR size original P, the abut shutter 41 is always positioned at the home position at an upstream side (left in FIG. 9) of the original discharge opening 17 at which the discharge rollers 16 are disposed, thereby effecting the alignment of the trail ends of the originals P discharged from the discharge rollers 16.

Regarding the A4 size original P, as shown in FIGS. 9 and 10, when the side regulating plates 4 are shifted to accommodate the A4 size original, as shown in FIG. 8, the A4 size original trail end regulating plate 201 is lifted by the levers 209, 210 to reach the position engageable with the abut shutter 41.

Thereafter, when the copying operation is started, the original resting tray 2 is lowered, and then, the abut shutter 41 is operated to bundle-convey the originals P. Immediately before the operation of the abut shutter is finished, the abut shutter 41 is engaged by the A4 size original trail end regulating plate 201 to rotate the original trail end regulating plate 201 around the shaft 213 to cock it, and the hook member 203 is engaged by the original trail end regulating plate 201, thereby positioning the trail end regulating plate 201 at the cocked position.

After the bundle-conveyance of the originals P is finished, as mentioned above, the original supply with the air separation in the flow reading mode is started. Before the original P which was read in the flow reading mode is discharged onto the original resting tray 2, the abut shutter 41 is returned to and is waiting at the home position at the upstream side of the original discharge opening 17 at which the discharge rollers 16 are disposed (FIG. 9).

After the abut shutter 41 is returned to the home position, the original bundle P on the original resting tray 2 is prevented from destroying rearwardly by the cocked and fixed trail end regulating plate 201. When the original P1 is discharged from the original discharge opening 17, the original P1 is dropped onto the original resting tray 2 and rides on the trail end regulating plate 201. Immediately after the original P1 is dropped, the abut shutter 41 is operated in the similar manner to the bundle-conveyance to convey the original P1 riding on the trail end regulating plate 201 to the predetermined position, and the trail end of the dropped original P1 is aligned by the trail end regulating plate 201 (FIG. 10).

By performing the above-mentioned operations whenever the original P is discharged from the original discharge opening 17, even when the position of the discharge rollers 16 is fixed regardless of the original size, the trail end of the discharged original P can be aligned at the predetermined position where the original is regulated by the trail end regulating plate 201.

Figure 11:
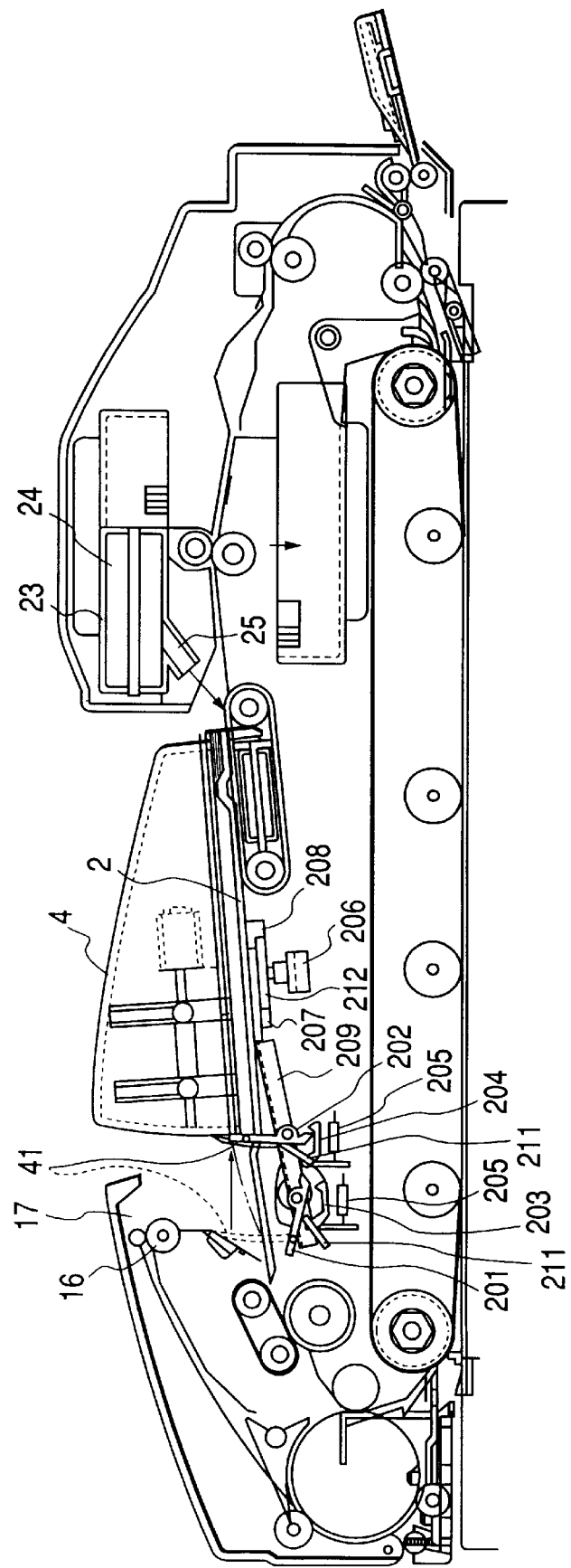

Regarding the B5 size original P, the side plates 4 are shifted to accommodate the B5 size original. In this case, according to the above-mentioned arrangement, since the A4 size original trail end regulating plate 201 is not lifted by the levers 209, 210, the trail end regulating plate 201 is not cocked even when the abut shutter 41 is operated (FIG. 11).

As is in the A4 size original P, when the copying operation is started, the B5 size original bundle P is bundle-conveyed to the predetermined position. Immediately before the bundle-conveyance is finished, the abut shutter 41 is engaged by the B5 size original trail end regulating plate 202 to rotate and cock the trail end regulating plate 202, and the hook member 204 is engaged by the trail end regulating plate 202, thereby positioning the trail end regulating plate 202 at the cocked position. The further sheet supply and sheet discharge are the same as those regarding the A4 size original P.

Figure 12:
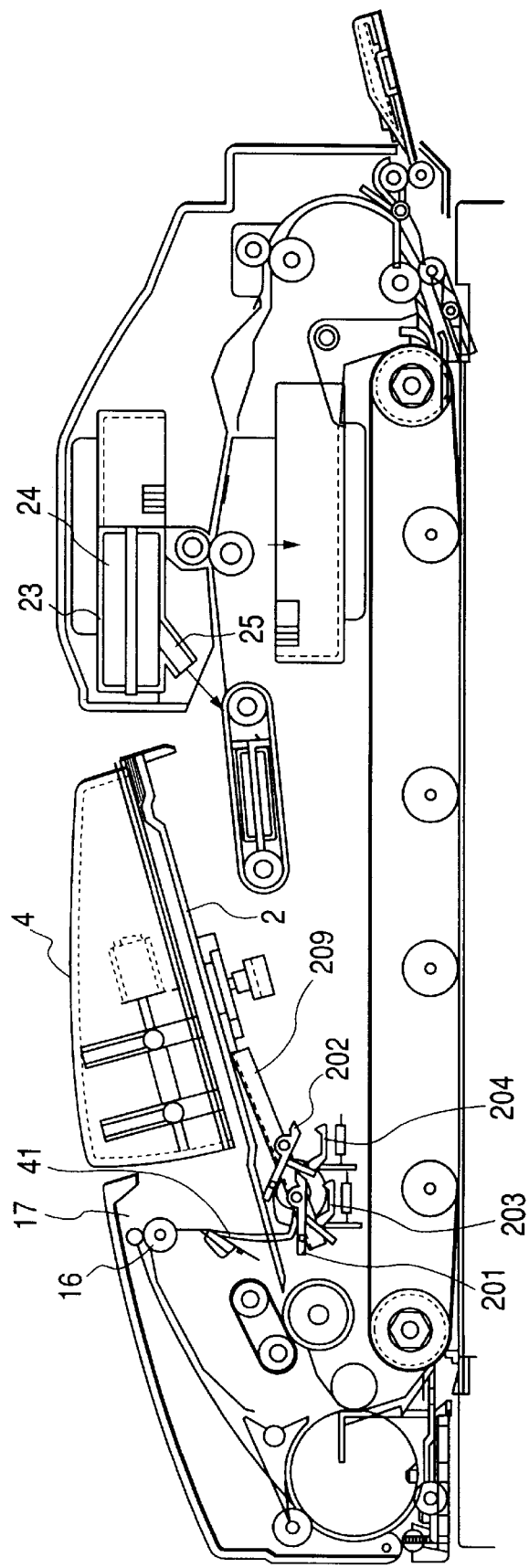
Figure 13:
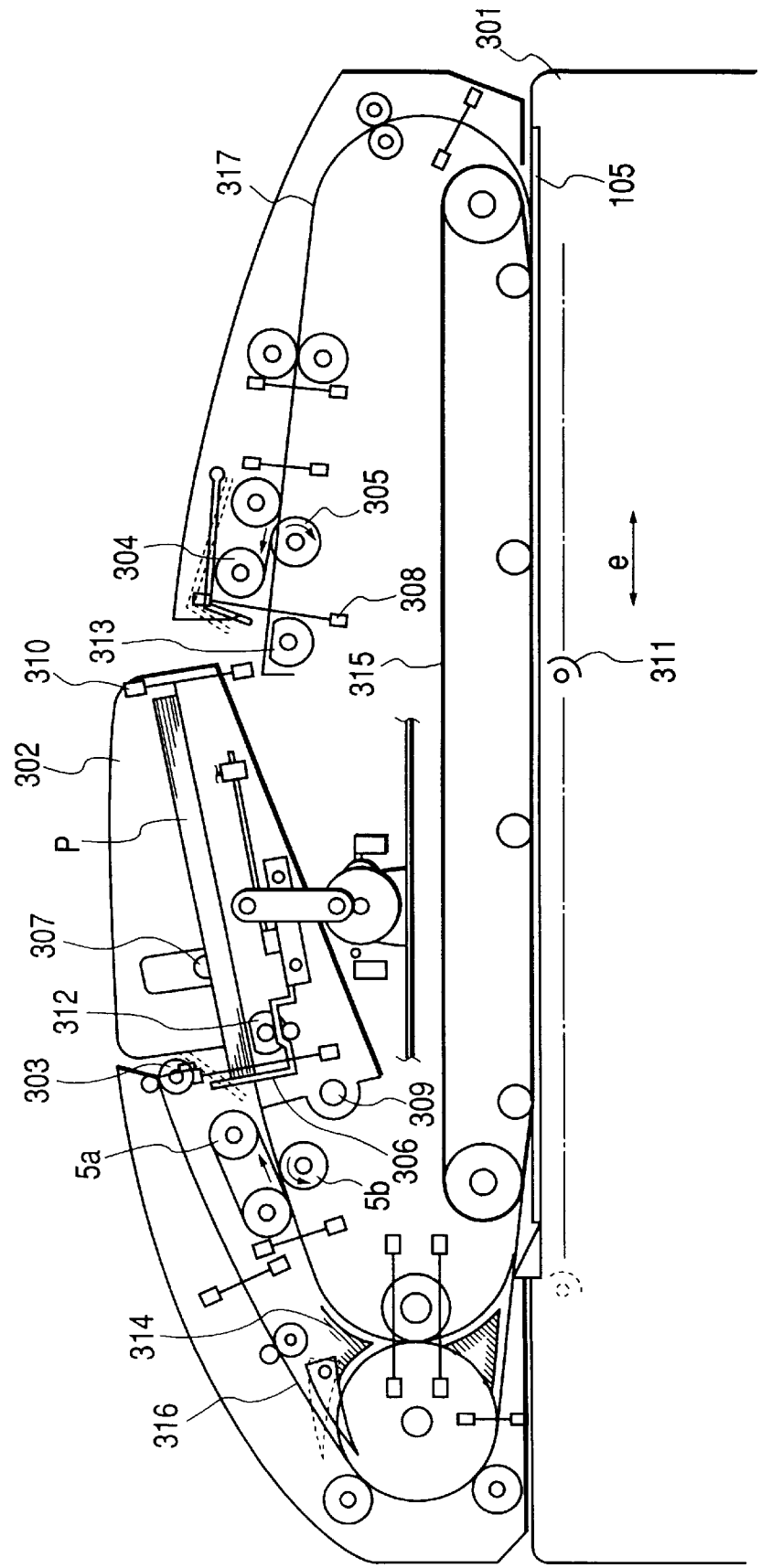
FIG. 13 is an explanatory view for explaining a conventional technique.
Figure 14:
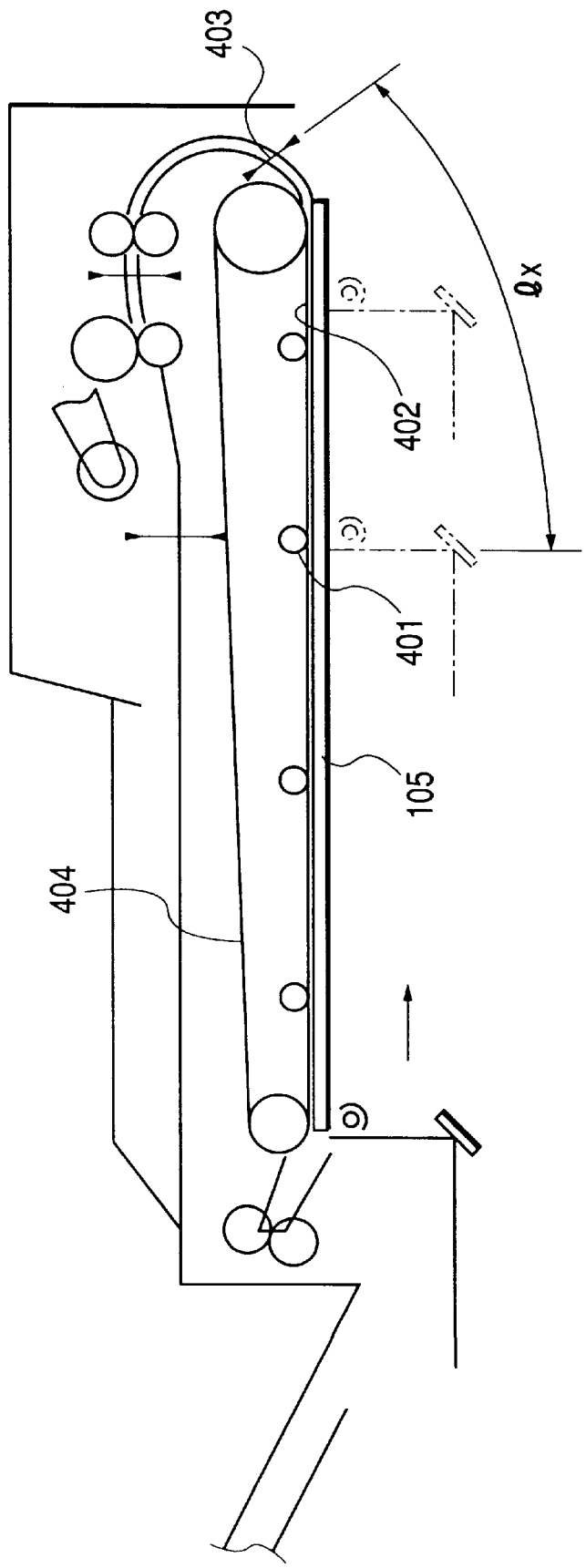
FIG. 14 is an explanatory view for explaining another conventional technique.
Figure 15:
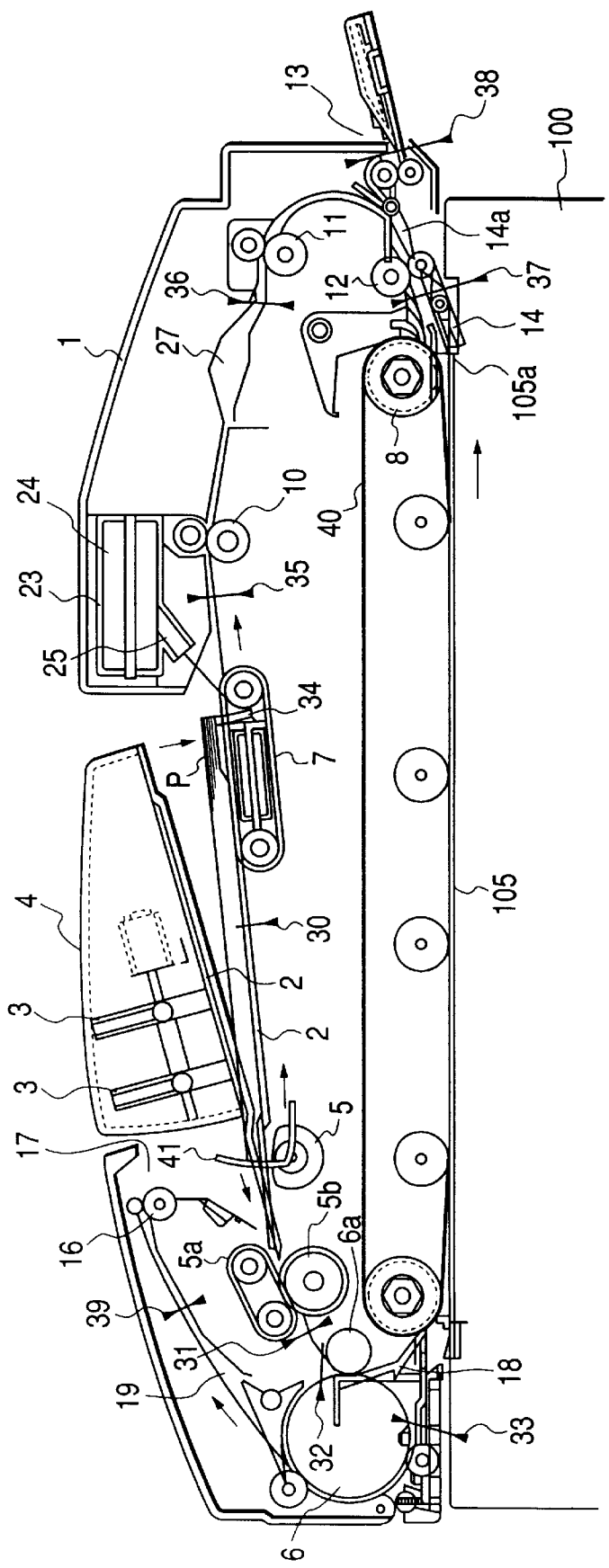
FIG. 15 is an explanatory view for explaining a further conventional technique.

Although each original P is copied in this way, when the original resting tray 2 is lifted after the job, since the engagement between the trail end regulating plates 201, 202 and the hook members 203, 204 is released, the trail end regulating plates 201, 202 are retarded below the original resting surface of the original resting tray 2 again (FIG. 12).

Incidentally, in the illustrated embodiment, while an example that the circulating supply of the originals P is effected by using the air separation was explained, for example, other separation/supply means such as retard separation may be used. Further, while an example that the originals P having small size such as A4 size or B5 size are used was explained, originals having a large size, such as A3 size, or B4 size may be used.

Further, while an example that the trail end regulating plates (second trail end regulating members) 201, 202 are cocked in synchronism with the abut shutter (first trail end regulating member) 41 was explained, the cocking of the trail end regulating plates 201, 202 may be controlled by an additional drive means (for example, solenoid and motor) independently from the abut shutter 41.

What is claimed is:

1. A sheet supplying apparatus capable of circulatingly supplying sheets, comprising:

sheet resting means on which the sheets rest;

a sheet supply means for supplying the sheets resting on said sheet resting means;

a trail end regulating member provided in correspondence to a trail position of a sheet and protruded from a sheet resting surface of said sheet resting means; and urging means for urging the sheets by abutting against the trail end of the sheet discharged on said sheet resting means through a sheets discharge opening to shift the sheet so that the trail end thereof rides over said trail end regulating member.

2. A sheet supplying apparatus according to claim 1, wherein the sheet discharge opening includes a discharge roller whose position is fixed.

3. A sheet supplying apparatus according to claim 2, wherein said sheet resting means is a resting plate inclined so that an end of said resting plate at an upstream side in a supplying direction becomes lower than its other end, and the upstream side is regulated by said trail end regulating member.

4. A sheet supplying apparatus according to claim 3, wherein said sheet supply means separates the sheets, one by one, from a lowermost one.

5. A sheet supplying apparatus according to claim 4, wherein a plurality of said trail end regulating members are provided, and one of said trail end regulating members is selected in accordance with the size of the sheet and protrudes from said sheet resting surface.

6. A sheet supplying apparatus according to claim 5, wherein one of said plurality of said trail end regulating members is selected in accordance with the shift amount of a sheet width aligning means on said sheet resting means.

7. A sheet supplying apparatus according to claim 6, wherein the selected trail end regulating member protrudes in synchronism with the shifting movement of said urging means and is locked in a protruded condition.

8. A sheet supplying apparatus according to claim 7, wherein the shifting movement of said urging means is effected to shift a sheet bundle resting on said sheet resting means toward said sheet supply means, prior to a sheet supply operation.

9. A sheet supplying apparatus according to claim 8, wherein two of said trail end regulating members for small size and for long size, respectively, are provided, so that said trail end regulating members are normally laid, and said trail end regulating member for long size can be cocked by the shifting movement of said urging means when the sheet width aligning means is shifted to accommodate a long size sheet.

10. A sheet supplying apparatus according to claim 9, wherein said sheet supply means has a belt and an absorption means to feed the sheet separated by air upwardly.

11. A sheet supplying apparatus according to claim 10, further comprising:

a first path curved downwardly for guiding the separated sheet;

a processing portion for processing the sheet guided by said first path; and a second path curved upwardly for directing the processed sheet to said sheet resting means.

12. A sheet supplying apparatus according to claim 11, wherein said processing portion is a sheet reading portion.

13. A sheet supplying apparatus according to claim 1, wherein said sheet supply means has a separation means for separating the sheets by flowing air, and an absorption belt for absorbing and supplying the separated sheet.

14. A sheet supplying apparatus according to claim 13, wherein the supplied sheet is directed to a reading portion through a downwardly curved path, and, after reading, the sheet is returned to said sheet resting means through an upwardly curved path.

15. An image reading apparatus including a sheet supplying apparatus capable of circulating supplying sheets, comprising:

a sheet resting means on which the sheets are rested;

a sheet supply means for supplying the sheets rested on said sheet resting means;

a trail end regulating member provided in correspondence to a trail position of the sheets and protruded from a sheet resting surface of said sheet resting means;

an urging means for urging the sheets by abutting against the trail end of the sheets discharged on said sheet resting means through a sheet discharge opening to shift the sheets so that the trail end thereof rides over said trail end regulating member; and image reading means for reading an image on a supplied sheets.

* * * * *

UNITED STATES PATENT AND TRADEMARK OFFICE
CERTIFICATE OF CORRECTION

PATENT NO. : 6,092,799  Page 1 of 1
DATED : July 25, 2000
INVENTOR(S) : Michiro Koike It is certified that error appears in the above-identified patent and that said Letters Patent is hereby corrected as shown below:

Title page,
Item [57], ABSTRACT,
Line 4, "trail" should read -- trailing --.
Item [56], References Cited, FOREIGN PATENT DOCUMENTS, "404140267" should read -- 4-140267 --, and "Hirosa" should read -- Hirose --.

Column 1,
Line 8, "ratus" should read -- ratus, --.
Line 12, "types" should read -- types: --.

Column 2,
Line 46, "abuts" should read -- abut --.

Column 4,
Line 29, "are" should read -- is --.

Column 15,
Line 43, "sheets" should read -- sheet --.
Line 59, "are" should read -- is --.

Signed and Sealed this

Tenth Day of February, 2004

JON W. DUDAS
*Acting Director of the United States Patent and Trademark Office*